Patented Dec. 17, 1968

3,417,164
POLYMERIC PHOSPHORUS-CONTAINING COMPOUNDS

John T. Patton, Jr., Wyandotte, and Robert J. Hartman, Southgate, Mich., assignors to Wyandotte Chemicals Corporation, Wyandotte, Mich., a corporation of Michigan
No Drawing. Filed Oct. 2, 1964, Ser. No. 401,232
8 Claims. (Cl. 260—926)

ABSTRACT OF THE DISCLOSURE

Polymeric phosphorus-containing compounds are prepared by the self-transesterification of essentially neutral phosphate polyols obtained by the reaction of an alkylene oxide with an acid of phosphorus corresponding to a $P_2O_5$ equivalency of from about 72 to 95 percent.

---

This invention relates to new phosphorus-containing compounds and to a method of preparing the same. More particularly, this invention relates to phosphorus-containing polymers prepared by the self-transesterification of certain phosphate polyols.

In accordance with this invention, it has been determined that new phosphorus-containing polymers may be prepared by the self-transesterification of essentially neutral phosphate polyols which are the reaction products of an alkylene oxide with an acid of phosphorus corresponding to a $P_2O_5$ equivalency of from about 72 to 95 percent. It is surprising and unexpected that the self-transesterification of the phosphate polyols so readily occurred in accordance with this invention since heretofore the transesterification of esters of phosphoric acid was considered to proceed so slowly that "a number of organic chemists have said that the reaction does not occur." John R. Van Wazer, Phosphorus and Its Compounds, vol. I, page 585. The new polymers of this invention range from pourable liquids to high viscosity rubber-like products. This affords application in polyurethane foams, polyester resins, as plasticizers in vinyl-type resins, as additives for functional fluids, and as surface active agents.

The essentially neutral phosphate polyols which are self-transesterified into the phosphorus-containing polymers of this invention may be prepared in several ways. Preferably, however, the said phosphate polyols employed in accordance with this invention will be prepared by the direct reaction of an alkylene oxide with an acid of phosphorus corresponding to a $P_2O_5$ equivalency of from about 72 to 95 percent. The phosphate polyols may also be prepared by oxidation of the corresponding phosphite polyols by the method disclosed in U.S. 3,081,331.

The exact structure obtained when the reaction products are self-transesterified is unknown. Unquestionably, a mixture of chemical structures exits, some of which contain recurring oxy-phosphorus units while others contain long-chain oxyalkylene units, while still others contain a combination of phosphorus and similar and/or dissimilar unsymmetrical and/or symmetrical oxyalkylene units. In view of this uncertainty, applicants do not wish to be bound by any exact chemical structure and will continue to refer to their new polymers as the products from the self-transesterification of certain phosphate polyols.

The amounts of alkylene oxide and acid of phosphorus which are necessary to prepare the essentially neutral phosphate polyols which are self-transesterified into the new polymers of this invention will vary, depending upon the alkylene oxide used and the $P_2O_5$ equivalency of the acid selected. For example, if propylene oxide and 100 percent phosphoric acid are the selected reactants, about six mols of propylene oxide per mol of acid is required to prepare the essentially neutral phosphate polyols. With higher molecular weight alkylene oxides and 100 percent phosphoric acid, less than six mols of the oxide per mol of the acid will give the desired phosphate polyols.

Acids of phosphorus which may be used in the preparation of the phosphate polyols which are transesterified according to this invention are those acids corresponding to a $P_2O_5$ equivalency of from about 72 to about 95 percent. Representative acids include 100 to 131 percent phosphoric acid, orthophosphoric acid, pyrophosphoric acid, polyphosphoric acid, certain metaphosphoric acids, certain partial esters of any of these acids, and mixtures of any of the above acids and/or esters. It is essential that the acid selected has a $P_2O_5$ equivalency of from about 72 to about 95 percent. If the acid has a $P_2O_5$ equivalency of substantially less than 72 percent, water will be present and the subsequent reaction with the alkylene oxide will result in glycol formation. Transesterification of this product will give a mixture of self-transesterification products and some products resulting from the esterification of the phosphate polyol with the glycols. If the acid has a $P_2O_5$ equivalency of greater than about 95 percent, very few hydroxyl groups are present for the self-transesterication and, as the percent approaches 100, no transesterification occurs.

Alkylene oxides which may be used in the preparation of the phosphate polyols which are transesterified according to this invention are those which contain an oxirane ring. Suitsable alkylene oxides include ethylene oxide, propylene oxide, the isomeric normal butylene oxides, hexylene oxide, octylene oxide, dodecene oxide, methoxy and other alkoxy propylene oxides, styrene oxide and cyclohexene oxide. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

Transesterification may occur in any of several ways. Heating between about 25° C. and 200° C., preferably between 80° C. and 150° C. under reduced pressures, for example from less than one millmeter of mercury up to one atmosphere, preferably less than 100 millimeters of mercury, optionally in the presence of a metal catalyst is perhaps the most basic and preferred way of carrying out the transesterification of this invention. Typical catalysts which may be used to accelerate the transesterification include sodium metal, organic amines, and inorganic bases. If a catalyst is employed, the amount may vary widely. Preferably, however, the catalyst is used in small concentrations which, in general, will amount to about 0.1 to ten percent by weight, based on the weight of the phosphate polyol. The time required for the transesterification reaction may vary from about two to 100 hours, depending on the particular phosphate polyol transesterified, the concentration of catalyst employed, if any, and the temperature and pressure of the transesterification reaction.

The following examples serve to illustrate the invention. All parts are by weight unless otherwise stated.

EXAMPLE I

Fifty parts of a phosphate polyol, having a hydroxyl number of 400, prepared by the reaction of six moles of propylene oxide wtih one mole of 100 percent phosphoric acid was added to a reaction vessel equipped with a nitrogen source, thermometer, and distillation head. After 0.5 part of metallic sodium was added to the vessel, the reaction mixture was heated to 100° C. and maintained there for eight hours under one millimeter of mercury pressure. A clear, colorless liquid was distilled from the reaction mixture during the eight-hour reaction time. Analysis of this liquid, along with additional distillate which was collected by further heating the reaction mixture at 150° C. under one millimeter of mercury pressure for nine hours, indicated the presence of glycols. There was obtained 33.3 parts of reaction product which was a viscous, clear liquid having a hydroxyl number of 108, a molecular weight of 9300, and contained 9.7 weight percent phosphorus.

EXAMPLE II

Fifty parts of a phosphate polyol, having a hydroxyl number of 351, prepared by the reaction of 120 parts of 100 percent phosphoric acid and 430 parts of propylene oxide was charged to a reaction vessel equipped with a nitrogen source, thermometer and distillation head. The phosphate polyol was heated for nine hours at 150° C. and under ten millimeters of mercury pressure in a nitrogen atmosphere. During the reaction period, seven parts of distillate was collected. Subsequent analysis of the distillate indicated the presence of various glycols. The reaction product was a viscous material which had a hydroxyl number of 195 and contained 8.9 weight percent phosphorus.

EXAMPLE III

A rigid polyurethane foam was prepared utilizing the transesterified reaction product of Example I by mixing the following components in the order listed:

| | Parts |
|---|---|
| Reaction product of Example 1 | 18 |
| Tolylene-2,4-diisocyanate | 3 |
| Polydimethylsiloxane | 0.2 |
| Freon 11 | 5 |
| Trimethylpiperazine | 1 |
| Stannous octoate | 0.1 |

The foam did not shrink, had excellent resistance to humidity and had very good resistance to flame.

EXAMPLES IV–XII

Phosphate polyols were prepared and transesterified at 140° C. to 160° C. under five millimeters of mercury pressure for four to six hours. The particular polyols prepared are tabulated below.

TABLE 1.—PHOSPHATE POLYOLS

| Alkylene Oxide | Parts | Acid of Phosphorus | Parts |
|---|---|---|---|
| Ethylene oxide | 398 | 100% Phosphoric | 98 |
| Propylene oxide | 170 | 115% Phosphoric | 50 |
| Do | 346 | Pyrophosphoric | 89 |
| Do | 456 | Tripolyphosphoric | 100 |
| Butylene oxide | 454 | 100% Phosphoric | 98 |
| 3,3,3-trichloropropylene oxide | 1,000 | do | 98 |
| Epichlorohydrin | 580 | do | 98 |
| Ethylene oxide / Butylene oxide | 140 / 230 | do | 98 |
| Ethylene oxide / Epichlorohydrin | 230 / 100 | do | 98 |

Upon transesterification of the above polyols, clear, viscous liquids were obtained, all of which had considerably lower hydroxyl numbers and considerably higher viscosities than the starting polyol materials. These changes demonstrate that transesterification occurred. The transesterified reaction products were used in the preparation of rigid polyurethane foams. Excellent foams with increased flame-retardancy were obtained.

We claim:

1. A phosphorus-containing polymer prepared by the self-transesterification at a temperature between 80° C. and 200° C. under a pressure of from 1 to 100 millimeters of mercury for about 2 to 100 hours with the elimination of glycols of an essentially neutral reaction product of an alkylene oxide with an acid of phosphorus corresponding to a $P_2O_5$ equivalency of from about 72 to 95 percent.

2. The polymer of claim 1 when the alkylene oxide is propylene oxide.

3. The polymer of claim 1 when the alkylene oxide is ethylene oxide.

4. The polymer of claim 1 when the alkylene oxide is butylene oxide.

5. The polymer of claim 1 when the alkylene oxide is epichlorohydrin.

6. The polymer of claim 1 when the alkylene oxide is 3,3,3-trichloropropylene oxide.

7. The polymer of claim 1 when the alkylene oxide is a mixture of ethylene oxide and butylene oxide.

8. The polymer of claim 1 when the phosphoric acid is 100 percent phosphoric acid.

References Cited

UNITED STATES PATENTS 3,099,676   7/1963   Lanham _____ 260—978 X

CHARLES B. PARKER, *Primary Examiner.*

A. H. SUTTO, B. BILLIAN, *Assistant Examiners.*

U.S. Cl. X.R.

260—928, 982, 978, 2.5, 30.6, 75; 252—32.5, 77